United States Patent Office.

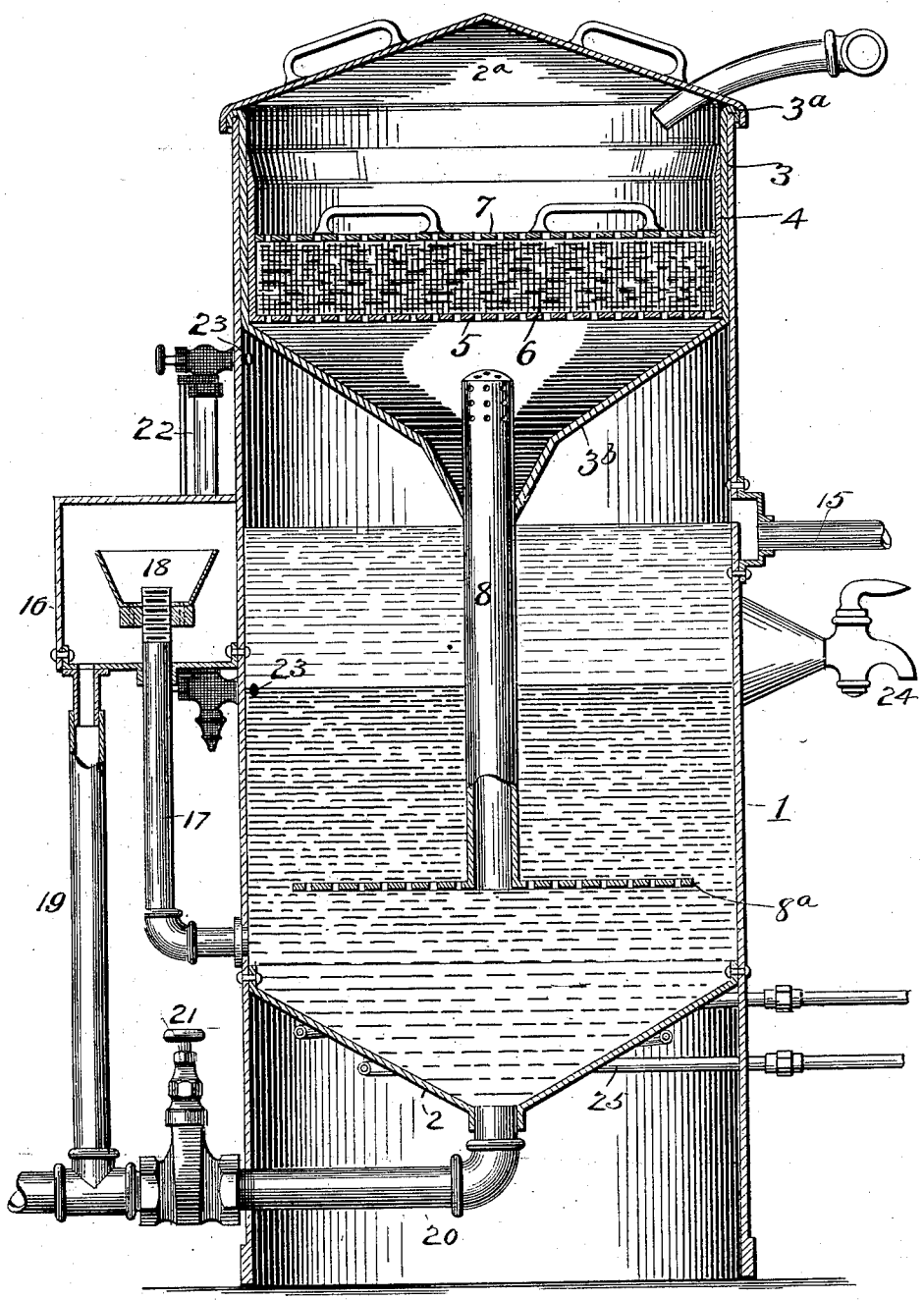

WILLIAM F. WARDEN, OF AKRON, OHIO.

OIL-FILTERING APPARATUS.

SPECIFICATION forming part of Letters Patent No. 671,098, dated April 2, 1901.

Application filed December 11, 1900. Serial No. 39,572. (No model.)

*To all whom it may concern:*

Be it known that I, WILLIAM F. WARDEN, a resident of Akron, in the county of Summit and State of Ohio, have invented certain new and useful Improvements in Oil-Filtering Apparatus; and I do hereby declare the following to be a full, clear, and exact description of the invention, such as will enable others skilled in the art to which it appertains to make and use the same.

My invention relates to an improved oil-filtering apparatus, the object of the invention being to provide an improved apparatus of this character whose operation will be continuous, ejecting pure oil at one point and superfluous water at another.

With this object in view the invention consists in certain novel features of construction and combinations and arrangements of parts, as will be more fully hereinafter described, and pointed out in the claims.

The accompanying drawing is a view in section illustrating my improvements.

1 represents a cylindrical can or receptacle having a conical bottom 2 and an open top. A cylindrical chamber 3, closed by a cover $2^a$, through which a drip-pipe projects, is supported in the upper end of the can by means of a curved flange $3^a$ on the upper edge of the chamber overlapping the upper end of the can, and the side walls of the latter project below the bottom $3^b$ thereof and form a support for the can, which is adapted to contain pure water up to the level shown in the drawing. The bottom $3^b$ of chamber 3 is made conical and has secured therein a pipe 8, having a closed perforated top above the bottom $3^b$ and projecting down into the water, as shown.

A filtering-receptacle 4 is supported in chamber 3 and is made with a perforated bottom 5 and adapted to contain a layer or stratum of filtering material 6—as, for instance, cotton-waste or sponge—and a perforated metal disk 7 is located on the filtering material 6 and supported thereby. The tube or pipe 8 projects below the bottom $3^b$ of chamber 3 and nearly to the bottom of the can, where it is provided with a deflecting-disk $8^a$.

An oil-overflow pipe 15 communicates with the can 1, near its upper end, and a water-chamber 16 is secured on the outside of the can, and a pipe 17 communicates with can 1, near the bottom thereof, and projects up into water-chamber 16, where it is provided with a flared discharge-spout 18, located in a horizontal plane slightly below that of the oil-outlet pipe 15, and an exhaust-pipe 19 for said chamber 16 connects the same with an exhaust-pipe 20. The exhaust-pipe 20 communicates with the extreme lower end of can 1 and is provided with a valve 21 between the can and pipe 19, for a purpose which will more fully hereinafter appear.

A transparent gage 22 communicates by cocks 23 at each end thereof with can 1, so as to disclose the oil-level, and a spigot 24 communicates with the oil-chamber for drawing off the pure oil.

A steam-pipe 25 projects through the side walls of can 1, beneath the bottom 2 thereof, and is then coiled around the conical bottom to heat the can and its contents to aid in the filtering of the oil.

The operation of my improvements is as follows: The drip from the engine or other machinery enters chamber 3 and passes through perforated disk or strainer 7 into filtering material 6, said strainer serving to catch any large particles of foreign matter and prevent its entrance into the filtering material. The fluid then passes through the filtering material 6 and perforated bottom 5 of chamber 4 into the conical bottom $3^b$ of chamber 3 until the oil reaches the level of the perforations in pipe 8, when it will flow down through the same. The increased weight of the water has a tendency to keep the oil back in pipe 8; but the pressure of oil in the chamber 3 forces it down and spreads it out over the bottom face of the disk $8^a$ in a very thin film, which constantly changes surface and grows thinner as it travels from the center to the circumference of the disk, thus exposing every particle of waste oil to the action of the water. When the oil leaves the disk it is in a finely-divided state of separation and thoroughly mixed with water, which washes it out and from which it separates by the difference in specific gravity, leaving all the impurities in the water. The impurities will settle to the bottom of can 1 and can be removed through pipe 20 by opening valve 21, as the pressure of water in the can will, owing to the conical bottom thereof, serve to flush it and draw out all sediment, and hence obviate the necessity of disconnecting and changing the pipes. From the disk 8ª the oil passes to the top of the water and remains there as pure oil until it reaches the level of overflow-pipe 15, when it will be conveyed to a suitable reservoir, or it can be drawn through spigot 24, as desired.

Water often collects in the drip-pans of the engine and is fed to the filter with the oil, and this extra water causes trouble with filters of ordinary construction; but with my improvements, as above explained, the pipe 17 will convey the extra water up into chamber 16, from which it will escape by pipe 19 into exhaust-pipe 20.

It will be seen that with my improvements the operation of filtering is continuous, that the amount of drippings which it will filter is unlimited, and that it is therefore applicable to oiling systems.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In an oil-filtering apparatus, the combination with a can or receptacle having an oil and water chamber, and filtering material in said receptacle in advance of said chamber, of an oil-overflow pipe for withdrawing filtered and washed oil, and a water-exhaust pipe communicating with the lower part of said chamber.

2. In an oil-filtering apparatus, the combination with a can or receptacle having an oil and water chamber, and filtering material in said can or receptacle in advance of said chamber, of an oil-overflow pipe for filtered and washed oil, a water-exhaust pipe communicating with the can below the water-line and projecting up to a height in a horizontal plane below that of the oil-overflow pipe, and a steam-coil for heating said can and its contents.

3. In an oil-filtering apparatus, the combination with a can or receptacle adapted to hold pure water, and filtering material in said can above the water-line, of a tube projecting down into the water, means for supplying oil to be filtered, to said tube, an overflow-pipe communicating with the oil-chamber above the water-line, and a water overflow or exhaust pipe communicating with the can near its lower end.

4. In an oil-filter, the combination with a can or receptacle having a water-chamber and a conical bottom, and filtering material in said can above the water-chamber, of a pipe for waste oil projecting below the water-line in said can, a deflecting-disk on said pipe adapted to be immersed in water in said chamber, and a pipe for exhausting the water and sediment from the can communicating with the conical bottom thereof.

5. In an oil-filtering apparatus, the combination with a can adapted to contain water and means for feeding the oil to be filtered into the water, of an overflow-pipe for oil above the water-line, a water-chamber on said can, a pipe connecting the water-chamber with the can below the water-line therein, an exhaust-pipe for water communicating with the bottom of the can, a water-escape pipe connecting the water-chamber and exhaust-pipe and a valve in the exhaust-pipe between the can and the escape-pipe.

In testimony whereof I have signed this specification in the presence of two subscribing witnesses.

WILLIAM F. WARDEN.

Witnesses:
B. I. HAWKINS,
F. B. BURCH.